(No Model.)
W. BRADFORD.
BEAN HARVESTER.
No. 270,381. Patented Jan. 9, 1883.
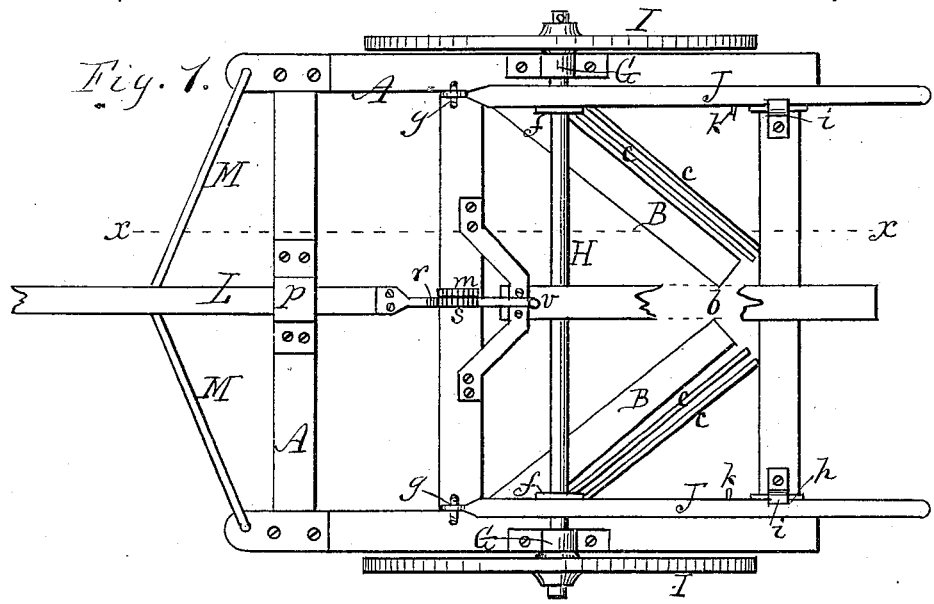
Fig. 1.
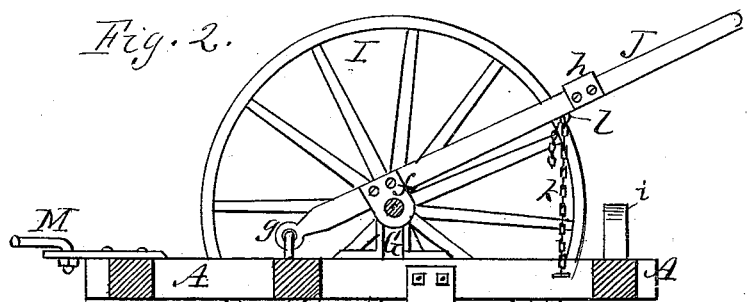
Fig. 2.
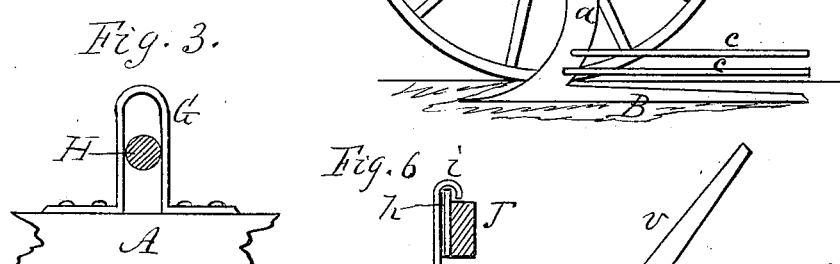
Fig. 3. Fig. 6. Fig. 5.
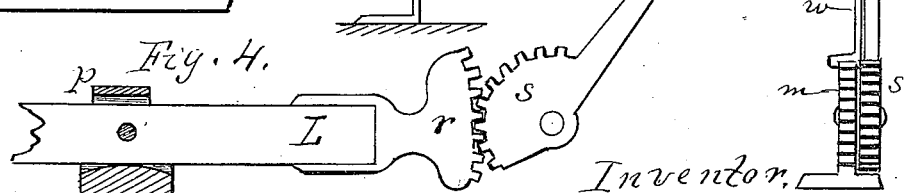
Fig. 4.
Attest:
C. F. Spencer
H. E. Shaffer
Inventor,
Wm. Bradford,
per R. F. Osgood,
atty.

United States Patent Office.

WILLIAM BRADFORD, OF BROCKPORT, NEW YORK.

BEAN-HARVESTER.

SPECIFICATION forming part of Letters Patent No. 270,381, dated January 9, 1883.

Application filed November 13, 1882. (No model.)

*To all whom it may concern:*

Be it known that I, WILLIAM BRADFORD, of Brockport, Monroe county, New York, have invented a certain new and useful Improvement in Bean-Harvesters; and I do hereby declare that the following is a full, clear, and exact description of the same, reference being had to the accompanying drawings, in which—

Figure 1 is a plan of the machine. Fig. 2 is a longitudinal vertical section in line $xx$ of Fig. 1. Fig. 3 is an elevation showing one of the guides in which the axle of the wheels rest. Fig. 4 is a side elevation, and Fig. 5 an edge elevation, of the devices for adjusting the tongue. Fig. 6 is a diagram showing one of the catches which hold the levers down.

In this invention cutters or scrapers arranged in V form, converging at their rear ends, are employed in a manner similar to that shown in my patent of August 1, 1876. These cutters run under the hills of two rows of beans, cut the stalks from the roots, and gather the stalks in a standing position, compressed in compact form, but without being removed from the ground.

My present invention consists in the combination, with such cutters attached to the frame, of an arrangement of levers, guides, chains, and catches of peculiar construction on opposite sides of the machine, as hereinafter described.

In the drawings, A shows the main frame, to which the cutters B B are attached in a permanent manner, the shanks $a$ $a$ being bolted directly to the frame. The cutters are in the form of flat blades, converging as they extend backward, leaving only a narrow throat, $b$, at the rear end. Each of these cutters passes beneath a row of beans, and the two rows, as they are cut, are gathered in the center and left standing in a compact mass.

$c$ $c$ are fingers, of which two are used with each cutter, being attached to the shank of the cutter one above another and extending backward parallel with the cutter, as shown. These fingers assist in gathering the beans by holding them in an upright position as they pass back.

I employ in connection with these cutters the following arrangement of parts:

G G are two vertical loops, forming guides, bolted fast on top of the frame on opposite sides. Through these guides passes the axle H, having the supporting-wheels I I attached at the outer ends. The axle has a free movement up and down in these guides.

J J are two levers—one on each side—provided with hangers $ff$, through which the axle passes. The front ends of the levers are jointed to loops $g$ $g$, by which arrangement the levers can be turned up and down vertically, and their rear ends are provided with plates $h$ $h$, which, when the levers are turned down, catch under hook-bearings $i$ $i$, attached to the top of the main frame, and thus hold the levers down. The levers can be disengaged from the hooks at any time by pressing down and moving them outward.

$k$ $k$ are chains attached to the main frame and hooked upon hooks $l$ $l$ of the levers. They gage the levers and prevent them from rising too high, and by letting them out or taking them up the levers may be gaged exactly as desired.

In going into the field or in turning corners the levers are turned down and engaged with the hooks, which elevates the main frame so that the cutters ride clear from the earth. In passing through the rows the levers are released, and the main frame falls so that the cutters pass into the earth beneath the rows. The depth to which the cutters enter the soil depends upon the length of the chains, which, as before described, can be gaged as desired. The levers are under perfect control of the operator, who by pressing them down can raise the cutters at any time. As the levers work up and down the loops or guides G G rise and fall over the axle and keep the parts in place. An important feature is that each lever, and its attachments, is separate from the other and works independently of it, so that if desired one chain may be hooked up longer or shorter than the other to adapt the machine to pass along an incline or a side hill. Arranged in this way the machine will cut two rows of beans at once, gather them together, and leave them in perfect condition behind, each half of the apparatus adapting itself to its work and operating independently of the other half, although both work together to cut and gather the beans by means of the two cutters. A uniformity of depth is maintained by the cutters, however irregular may be the surface over which the wheels pass, since as the wheels rise and fall the axle will rise and fall in the guide-loops, and the levers will correspondingly play up and down.

L is the tongue or pole by which the machine is drawn. It is held by a brace, M, and passes through a bearing, p. At the rear end it has a toothed segment, r, which engages with a toothed segment-pinion, s, provided with a lever, v. By throwing the lever forward or back the rear end of the tongue will be thrown up or down, thereby changing the pitch of the machine. The lever v is provided with a spring-clutch, w, which engages with a fixed segment, m, by which means the parts may be fastened at any adjustment.

The guides G G, instead of being fastened on top of the frame, as shown in the drawings, may be secured on the sides, if desired, extending upward in the same manner and holding the axle.

The machine may be used for cutting either one row or two rows of beans at a time.

Having thus described my invention, I claim—

In a bean-harvester, the combination, with the frame A, provided with the cutters B B, of the guide-loops G G, the levers J J, the chains k k, and the hooked catches i i, the axle being attached to the levers and passing through the loops, as shown and described, and for the purpose specified.

In witness whereof I have hereunto signed my name in the presence of two subscribing witnesses.

WM. BRADFORD.

Witnesses:
R. F. OSGOOD,
JACOB SPAHN.